US012044854B2

(12) United States Patent
Fletcher et al.

(10) Patent No.: US 12,044,854 B2
(45) Date of Patent: Jul. 23, 2024

(54) METHOD AND SYSTEM FOR PROJECTING AN IMAGE WITHIN AN EYE SAFETY LIMIT

(71) Applicant: GOOGLE LLC, Mountain View, CA (US)

(72) Inventors: Bergen Fletcher, Kitchener (CA); Antanas Matthew Broga, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/636,042

(22) PCT Filed: Sep. 9, 2020

(86) PCT No.: PCT/CA2020/051212
§ 371 (c)(1),
(2) Date: Feb. 17, 2022

(87) PCT Pub. No.: WO2021/046641
PCT Pub. Date: Mar. 18, 2021

(65) Prior Publication Data
US 2022/0334394 A1 Oct. 20, 2022

Related U.S. Application Data

(60) Provisional application No. 62/897,690, filed on Sep. 9, 2019.

(51) Int. Cl.
*G02B 27/01* (2006.01)
*G02B 26/08* (2006.01)

(52) U.S. Cl.
CPC ...... *G02B 27/0172* (2013.01); *G02B 26/0833* (2013.01); *G02B 2027/0178* (2013.01); *G09G 2320/0626* (2013.01)

(58) Field of Classification Search
None
See application file for complete search history.

(56) References Cited

U.S. PATENT DOCUMENTS

| 5,742,421 A | 4/1998 | Wells et al. |
| 2002/0120916 A1 | 8/2002 | Snider, Jr. |

(Continued)

FOREIGN PATENT DOCUMENTS

| CN | 203982756 U | 12/2014 |
| EP | 1916647 A1 | 4/2008 |

(Continued)

OTHER PUBLICATIONS

International Search Report and Written Opinion issued Jun. 8, 2016 for corresponding International Application No. PCT/US2016/018298, 14 pages.

(Continued)

*Primary Examiner* — Duane N Taylor, Jr.

(57) ABSTRACT

A system includes a light source to generate a source light, a spatial modulator to receive the source light. A display element to receive the source light from the spatial modulator and to direct the source light towards an eye, and a controller. The controller is to receive initial image data for an image to be displayed, the image comprising a plurality of pixels having a plurality of brightness levels, determine an image power based on the brightness levels, and determine an excess power status based on a comparison of the image power to a specified power threshold. Responsive to the excess power status indicating the image power is to exceed the specified power threshold, the controller is to reduce the brightness levels to generate updated image data, and control the light source and the spatial modulator to project the image using the updated image data.

20 Claims, 5 Drawing Sheets

(56) References Cited

U.S. PATENT DOCUMENTS

| | | | |
|---|---|---|---|
| 2007/0047808 A1 | 3/2007 | Choe et al. | |
| 2008/0037867 A1 | 2/2008 | Lee et al. | |
| 2013/0335642 A1 | 12/2013 | Fujioka | |
| 2014/0226193 A1 | 8/2014 | Sun | |
| 2014/0232651 A1 | 8/2014 | Kress et al. | |
| 2017/0184857 A1 | 6/2017 | Ato et al. | |
| 2017/0186404 A1 | 6/2017 | Hajjar et al. | |
| 2017/0192504 A1 | 7/2017 | Simmons | |
| 2019/0285893 A1 | 9/2019 | Wang et al. | |
| 2019/0304400 A1* | 10/2019 | Hong | G09G 5/14 |
| 2020/0120317 A1 | 4/2020 | Frederiksen et al. | |

FOREIGN PATENT DOCUMENTS

| | | | | |
|---|---|---|---|---|
| JP | 2010044204 A | | 2/2010 | |
| JP | 2013160905 A | | 8/2013 | |
| JP | 2017194623 A | * | 10/2017 | ........... G02B 26/023 |
| WO | WO-2018038439 A1 | * | 3/2018 | ......... G02B 27/0101 |
| WO | WO-2020017327 A1 | * | 1/2020 | ......... G02B 27/0172 |

OTHER PUBLICATIONS

International Preliminary Report on Patentability issued Aug. 22, 2017 for corresponding International Application No. PCT/US2016/018298, 12 pages.

International Search Report and Written Opinion mailed Nov. 23, 2020 for International Application No. PCT/CA2020/051212, 9 pages.

International Preliminary Report on Patentability mailed Mar. 17, 2022 for International Application No. PCT/CA2020/051212, 7 pages.

Office Action mailed May 13, 2022 for Indian Patent Application No. 202147057285, 6 pages.

Translation of Japanese Office Action mailed May 9, 2023 for JP Application No. 2021-574875, 9 pages.

Translation of Korean Office Action mailed May 30, 2023 for KR Application No. 10-2022-7000246, 17 pages.

Extended Eurpoean Search Report mailed Jun. 16, 2023 for European Application No. 20862958.4, 11 pages.

* cited by examiner

METHOD AND SYSTEM FOR PROJECTING AN IMAGE WITHIN AN EYE SAFETY LIMIT

CROSS-REFERENCE TO RELATED APPLICATIONS

The present application is a U.S. National Stage under 35 U.S.C. § 371 of International Patent Application Serial No. PCT/CA2020/051212, entitled "METHOD AND SYSTEM FOR PROJECTING AN IMAGE WITHIN AN EYE SAFETY LIMIT" and filed on 9 Sep. 2020, which claims priority to U.S. Provisional Application No. 62/897,690, entitled "METHOD AND SYSTEM FOR PROJECTING AN IMAGE WITHIN AN EYE SAFETY LIMIT" and filed on 9 Sep. 2019, the entireties of which are incorporated by reference herein.

BACKGROUND

Lasers are classified based on their potential to cause injury to human eyes and skin. There are four main classes for visible-beam lasers, with Class 1 lasers being the safest and Class 4 lasers being the least safe. Class 1 lasers are safe under most or all conditions of use—the lasers are safe either because of a low power output or due to an enclosure that prevents user access to the laser beam during normal operation. Class 2 lasers are relatively safe to the extent that the user does not stare at the beam without blinking for an extended period of time. Class 3 lasers are generally considered to be dangerous to the eye, especially when used in combination with optical devices that change the beam diameter or power density. Class 4 lasers put out high optical powers that are considered to be dangerous without optical devices that change beam diameter and/or power density. Some near-eye image display devices use laser projectors to project images to be viewed by a user. The safest near-eye image display device from a laser-safety perspective is that in which the maximum accessible exposure is managed such that from the perspective of the eye of the user the device is a Class 1 laser product.

In laser-based image display devices, lasers emit light that defines pixels of a display image. Each pixel may be defined by a combination of red light, green light, and blue light. The brightness of the pixel is related to the laser powers of the red light, green light, and blue light in the combination. Class 1 eye safety limit is a measure of allowable energy over a 100 second period. Class 1 eye safety limit dictates the allowable dosage of light broken out by wavelength. Blue light typically has the lowest dosage allowed, followed by green light and red light. Maximum near-eye display brightness must be based on knowing how much light is being exposed to the retina. Therefore, display brightness is limited by display area or fill factor. In one method, maximum pixel power is fixed to a level that allows a percentage of the frame, e.g., 25%, to be rendered at full white for 100 seconds to be safely under a Class 1 eye safe limit of 3.9 millijoules (mJ) per 100 seconds. In this case, a display image that is mostly white and exceeds the 25% fill factor will trip the laser safety monitoring system within the 100 second window. However, shutting down the laser projector because a display image is too bright may not be desirable from a device usability standpoint.

SUMMARY OF EMBODIMENTS

According to an implementation of the present specification there is provided a method comprising: receiving initial image data for an image to be displayed by a display device, the image comprising a plurality of pixels, the initial image data comprising a plurality of brightness levels associated with the pixels; determining an image power based on the brightness levels; determining an excess power status based on the image power and a power threshold; responsive to the excess power status indicating that the power threshold is to be exceeded, reducing the brightness levels to generate updated image data; and outputting the updated image data.

The outputting the updated image data may comprise providing the updated image data to the display device to be used to display the image.

The display device may comprise a wearable heads-up display.

The power threshold may comprise a safety limit for eye laser exposure.

The image may comprise an associated display time; the power threshold may comprise a threshold time and a power limit, the threshold time being longer than the display time; and the determining the excess power status may comprise: generating a predicted displayed power over the threshold time, the predicted displayed power generated based on the image power, the display time, and the threshold time; comparing the predicted displayed power with the power limit; and setting the excess power status to: affirmative if the predicted displayed power is greater than the power limit; and negative if the predicted displayed power is less than or equal to the power limit.

The image may be a given frame among a plurality of image frames to be displayed by the display device, each frame having an associated display time; the power threshold may comprise a threshold time and a power limit, the threshold time being longer than the display time; and the determining the excess power status may comprise: generating a predicted displayed power over the threshold time, the predicted displayed power generated based on the threshold time, a sample displayed time, and a sample displayed power, the sample displayed time and the sample displayed power associated with a sample set of the image frames selected from the plurality of the image frames; comparing the predicted displayed power with the power limit; and setting the excess power status to: affirmative if the predicted displayed power is greater than the power limit; and negative if the predicted displayed power is less than or equal to the power limit.

The sample displayed time may be shorter than the threshold time.

The determining the image power may comprise determining the image power further based on a set of wavelengths of a corresponding light to be used to display each pixel.

The determining the image power may comprise generating an image histogram of the brightness levels, the image histogram to store a number of the pixels at each of a plurality of predetermined brightness levels.

The reducing the brightness levels may comprise multiplying the brightness levels by a scaling factor being smaller than one.

The method may further comprise: obtaining a power loss ratio associated with the display device. The determining the image power may comprise determining an adjusted image power based on the brightness levels and the power loss ratio; and the determining the excess power status may comprise determining the excess power status based on the adjusted image power and the power threshold.

According to another implementation of the present specification there is provided a system comprising: a light source configured to generate a source light; a spatial modulator configured to receive the source light from the light source; a display element configured to receive the source light from the spatial modulator and direct the source light towards an eye of a viewer; and a controller in communication with the light source and the spatial modulator. The controller is configured to: receive initial image data for an image to be displayed by the system, the image comprising a plurality of pixels, the initial image data comprising a plurality of brightness levels associated with the pixels; determine an image power based on the brightness levels; determine an excess power status based on the image power; responsive to the excess power status indicating that a specified power threshold is to be exceeded, reduce the brightness levels to generate updated image data; and control the light source and the spatial modulator to project the image using the updated image data.

The system may be a wearable heads-up display.

The power threshold may comprise a safety limit for eye laser exposure.

The image may have an associated display time; the power threshold may comprise a threshold time and a power limit, the threshold time being longer than the display time; and to determine the excess power status the controller may be to: generate a predicted displayed power over the threshold time, the predicted displayed power generated based on the image power, the display time, and the threshold time; compare the predicted displayed power with the power limit; and set the excess power status to: affirmative if the predicted displayed power is greater than the power limit; and negative if the predicted displayed power is less than or equal to the power limit.

The image may be a given frame among a plurality of image frames to be displayed, each frame having an associated display time; the power threshold may comprise a threshold time and a power limit, the threshold time being longer than the display time; and to determine the excess power status the controller may be to: generate a predicted displayed power over the threshold time, the predicted displayed power generated based on the threshold time, a sample displayed time, and a sample displayed power, the sample displayed time and the sample displayed power associated with a sample set of the image frames selected from the plurality of the image frames; compare the predicted displayed power with the power limit; and set the excess power status to: affirmative if the predicted displayed power is greater than the power limit; and negative if the predicted displayed power is less than or equal to the power limit.

The sample displayed time may be shorter than the threshold time.

To determine the image power the controller may be to determine the image power further based on a set of wavelengths of the source light to be used to display each pixel.

To determine the image power the controller may be to generate an image histogram of the brightness levels, the image histogram to store a number of the pixels at each of a plurality of predetermined brightness levels.

To reduce the brightness levels the controller may be to multiply the brightness levels by a scaling factor being smaller than one.

The controller may be further to: obtain a power loss ratio associated with the system. To determine the image power the controller may be to determine an adjusted image power based on the brightness levels and the power loss ratio; and to determine the excess power status the controller may be to determine the excess power status based on the adjusted image power and the power threshold.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

When displaying images, directing excessive amounts of optical power towards an eye of a viewer may cause discomfort or harm to the eye. As such, safety guidelines may be in effect to set power thresholds on the optical power output of display devices. Such power thresholds may comprise a power limit and a threshold time. For example, a power threshold may be specified as 3.9 mJ of power limit over a 100 s threshold time. In some examples the power limit may be expressed in the units of energy, as is the case for example for the power threshold of 3.9 mJ over 100 s. This power threshold is exemplary, and it is contemplated that other power thresholds may also be used. In some examples the 3.9 mJ over 100 s may correspond to a safety limit for eye exposure to Class 1 laser light.

Image display devices may comprise a safety switch that turns off the display if the power threshold is exceeded. Such a switch may be implemented in hardware, in machine-readable instructions, or using a combination of hardware and machine-readable instructions. Such safety switches may force the display to remain off until the threshold time is reached, and the display may be turned on again. For example, if the power threshold is 3.9 mJ/100 s, and the display device outputs 3.9 mJ of energy in the first 50 s, then the safety switch may force the display device to remain off for 50 s until the 100 s threshold time is reached, and the display may turn on again. Such display off periods dictated by the safety switch may undermine a viewer's ability to have uninterrupted use of the display device.

Figure 1:
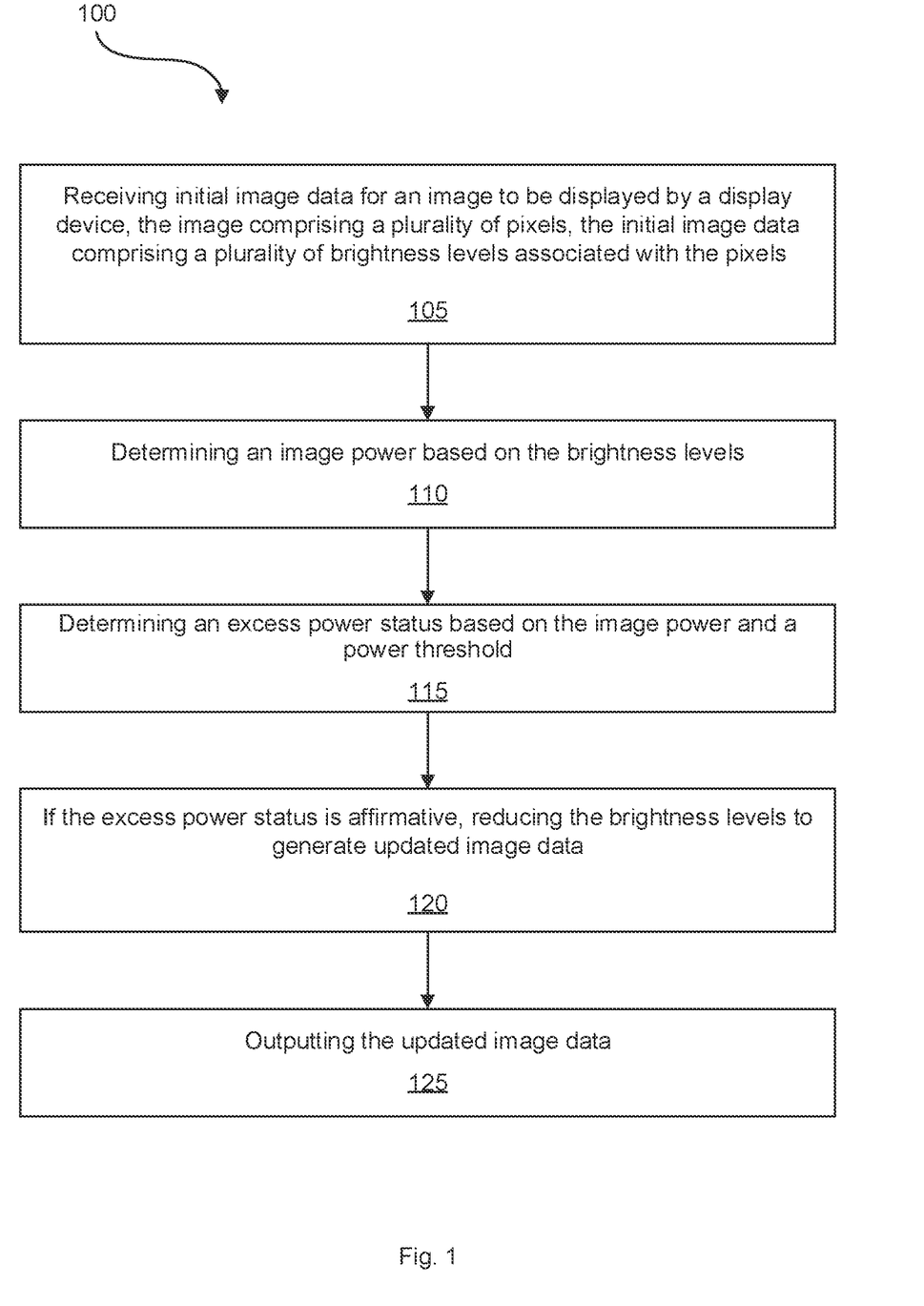
FIG. 1 shows a flowchart of an example method used to adjust the brightness of an image displayed by a laser-based display device, in accordance with some embodiments.

In order to reduce such interruptions, before projecting the image data may be analyzed and brightness levels of the pixels of the image may be adjusted to reduce the likelihood of the image display device exceeding the power threshold. In some examples, such adjustments may be performed dynamically as the display device receives the initial image data and before the image is formed or projected. FIG. 1 shows a flowchart of an example method 100, which may be used to adjust the brightness of an image. At block 105 initial image data may be received for an image to be displayed by the display device. As described above, the image may comprise a plurality of pixels. The initial image data may comprise a plurality of brightness levels associated with the pixels.

At block 110, an image power may be determined based on the brightness levels. Image power may provide a measure of the optical energy in the image over time. In some examples image power may comprise an average power calculated as the average brightness (i.e. intensity) over a given period of time. Moreover, in some examples image power may comprise an instantaneous power calculated as the brightness level over a short time period $\Delta t$ or dt. Furthermore, in some examples the display time for the image may be known or predetermined. For example, where the image is a frame of a video, the frame rate may determine the display time of the image. Similarly, in examples where a displayed image is refreshed at a predetermined refresh rate, the refresh rate may determine the display time of the image. In such examples, the image power may be calculated as the brightness levels (i.e. intensity) of the pixels of the image over the duration of the display time.

Figure 2:
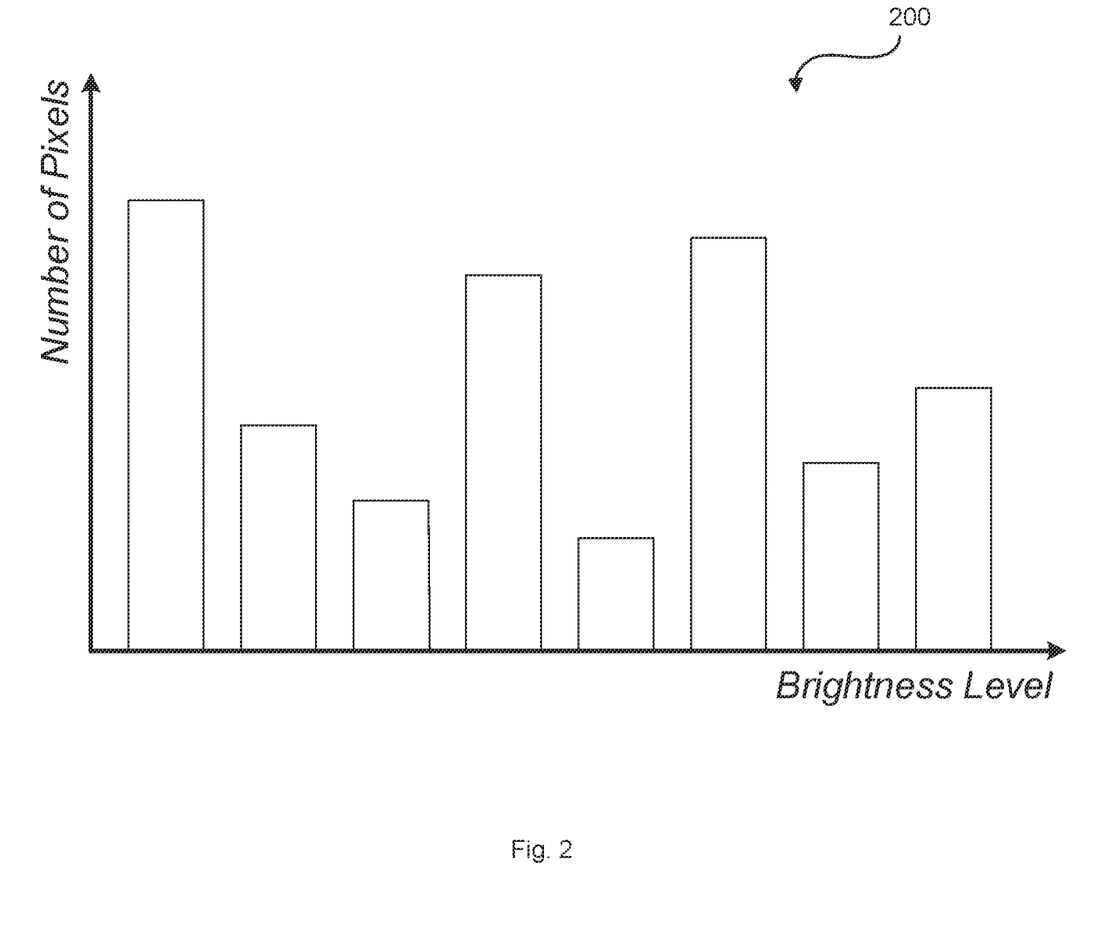
FIG. 2 shows an example histogram depicting a number of pixels at different brightness levels for an image displayed by a laser-based display device, in accordance with some embodiments.

Moreover, in some examples determining the image power may comprise generating an image histogram of the brightness levels. The image histogram may store the number of pixels of the image at each of a plurality of predetermined brightness levels. FIG. 2 shows an example histogram 200 depicting the number of pixels at seven different brightness levels. It is contemplated that in some examples the range of brightness levels of the pixels of the image may be divided into a number of discrete ranges or bins other than seven. For example, some example histograms may comprise 255 or more discrete ranges or bins of brightness levels.

In some examples determining the image power may comprise determining the image power further based on a set of wavelengths of the light to be used to display each pixel. Different wavelengths of light correspond to differing amounts of optical energy, with the shorter wavelengths (e.g. blue) being more energetic than the longer wavelengths (e.g. red). As such, the wavelengths of the light used to form or project the pixels of the image may also be taken into account in determining the image power of the image.

In addition, in some examples a different histogram may be generated for each color of the image. For example, if red (R), green (G), and blue (B) lights are used to form or project the image, three different R, G, and B histograms may be formed. Furthermore, in some examples a composite histogram may be generated which combines R, G, and B brightness information in one histogram.

Turning now to block 115, an excess power status may be determined based on the image power and a power threshold. The excess power status may be affirmative or negative. An affirmative excess power status indicates that based on the image power, the power threshold is expected to be exceeded. Similarly, a negative excess power status may indicate that based on the image power, the power threshold is not expected to be exceeded.

As discussed above, the power threshold may comprise a threshold time and a power limit. For example, in the case of the Class 1 lasers, the eye exposure power threshold may impose a 3.9 mJ power limit not to be exceeded over any 100 second threshold time. In many cases the display time for the image may be shorter than the threshold time of the power threshold. For example, for a 60 Hz or 120 Hz frame rate or refresh rate, the display time for each frame or the time between consecutive refreshes of the image may be much shorter than 100 s. In such examples, the likelihood of exceeding the power threshold may be extrapolated or predicted based on the image power and by taking into account the display time of the image in relation to the threshold time of the power threshold.

As such, in some examples determining the excess power status may comprise generating a predicted displayed power over the threshold time. This predicted displayed power may be generated based on the image power, the display time, and the threshold time. As discussed above, in some examples the predicted displayed power may comprise an extrapolation of the image power from the display time of the image to the threshold time of the power threshold. It is contemplated that linear or other types of extrapolation may be used. Moreover, in some examples statistical or machine learning methods may be used to assist with generating the predicted displayed power. Such methods may rely on sample image data or an image data training dataset to form predictions of the displayed power over the threshold time.

The predicted displayed power may then be compared with the power limit. The excess power status may be set to affirmative if the predicted displayed power is greater than the power limit, and to negative if the predicted displayed power is less than or equal to the power limit.

Furthermore, as discussed above, in some examples the image may be a given frame among a plurality of image frames to be displayed by the display device. For example, the image may be a frame in a video. Each frame may have an associated display time. In such examples, a subset or sample of n frames may be used as the basis for forming the predicted displayed power, where n is greater than one. Relying on more than one frame for forming the predicted displayed power may increase the accuracy of the prediction of displayed power over the threshold time.

This sample of n frames may collectively have a sample display time and a sample displayed power. Determining the excess power status may comprise generating the predicted displayed power over the threshold time, and the predicted displayed power may be generated based on the threshold time, the sample displayed time, and the sample displayed power. As discussed above, the sample displayed time and the sample displayed power may be associated with the sample set of the image frames selected from the plurality of the image frames.

Once the predicted displayed power is generated based on the sample of the frames, then this predicted displayed power may be compared with the power limit. The excess power status may be set to affirmative if the predicted displayed power is greater than the power limit, and to negative if the predicted displayed power is less than or equal to the power limit.

While some of the above examples describe generating a predicted displayed power when the display time is shorter than the threshold time, it is contemplated that in some examples the displayed power over the threshold time may be calculated, and need not be predicted. For example, when playing video the total duration of which is longer than the threshold time, determining and adding up the image power for a sufficient number of frames of the video to span the threshold time may allow for calculating the displayed power over the threshold time, which may then be compared with the power threshold.

Figure 3:
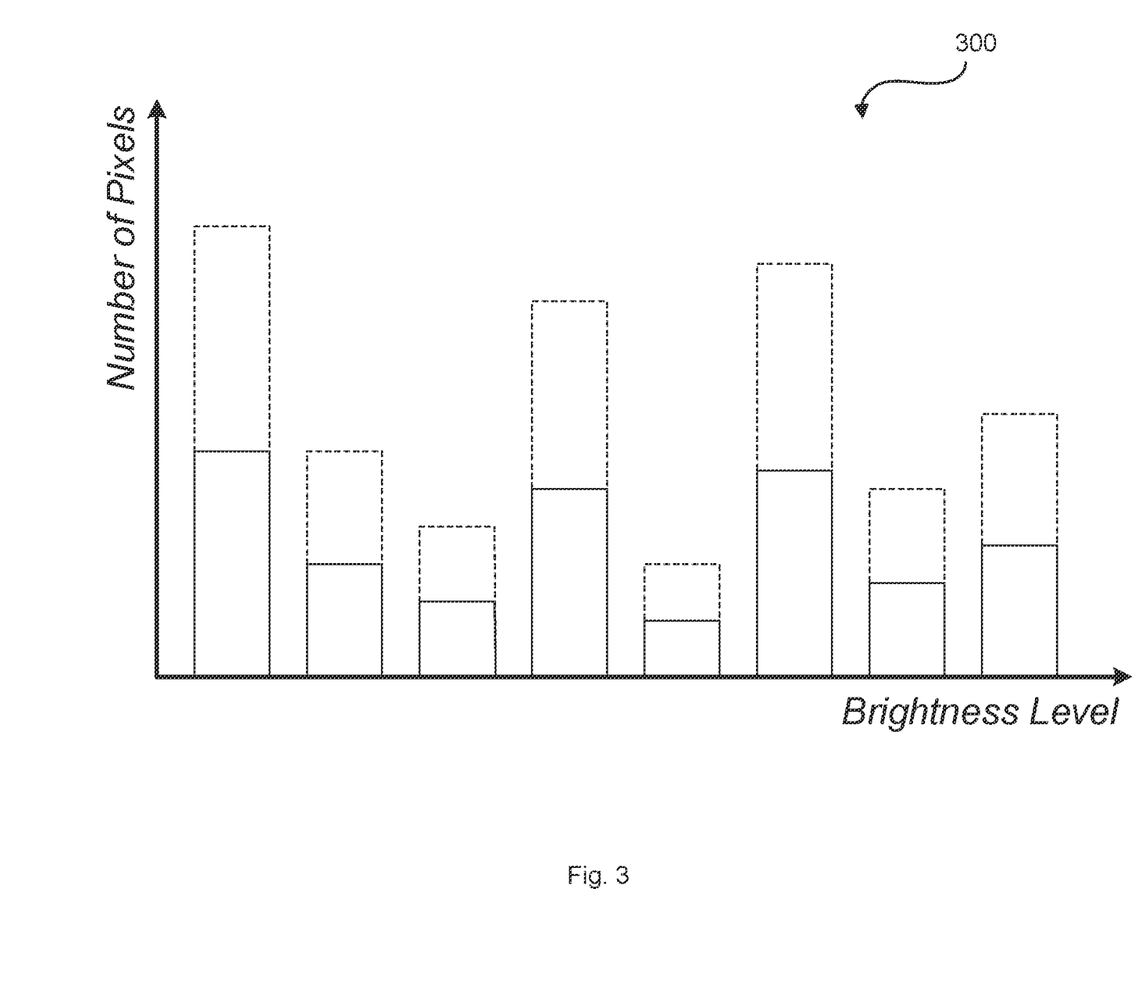
FIG. 3 shows another example histogram depicting the number of pixels at different brightness levels, in accordance with some embodiments.

Turning now to block 120 of method 100, if the excess power status is affirmative, the brightness levels may be reduced to generate updated image data. In some examples, reducing the brightness levels may comprise multiplying the brightness levels by a scaling factor being smaller than one. FIG. 3 shows an example histogram 300, which may be obtained by multiplying the brightness levels of histogram 200 (shown in dashed lines in FIG. 3 and also shown in FIG. 2) by the scaling factor of 0.5.

It is also contemplated that in some examples the brightness levels may be reduced in a manner different than multiplying the histogram by a scaling factor. Moreover, it is contemplated that in some examples the reduction in brightness levels may be implemented differently for different brightness levels. For example, the reduction in the brightness levels may be a function of the starting brightness of a given pixel. For example, a relatively brighter pixel may be dimmed more than relatively less bright pixels. Furthermore, in some examples the reduction in brightness levels may be implemented differently for different wavelengths (i.e. colors). For example, the more energetic wavelengths (e.g. blue or green) may have their brightness reduced differently than the less energetic wavelengths (e.g. red).

Reducing the brightness levels may reduce the likelihood of the power threshold being exceeded. This in turn, may enhance the ability of the display device to avoid having to shut shown due to the power threshold being exceeded. Moreover, the ability to dynamically adjust brightness levels based on or in response to initial image data may allow the display device to be used as an open platform for content developers by reducing or obviating the need to impose a priori brightness or image power restrictions on the content being developed for the display device.

Moreover, the ability to dynamically adjust the brightness and image power may make interaction with the display device more comfortable for the viewer and any bystanders. In some examples the increased comfort may be due to a reduction of user eye strain caused by high levels of image brightness. In addition, the ability to dynamically adjust the brightness and image power may also contribute to saving or conserving power used to display the images.

Turning now to block 125, the updated image data may be output. In some examples outputting the updated image data may comprise saving the updated image data to memory or sending the updated image data to another component, device, or to an output terminal. Moreover, in some examples outputting the updated image data may comprise providing the updated image data to the display device to be used to display the image. In some examples, the display device may comprise a wearable heads-up display, as will be described in greater detail in relation to FIG. 5.

In addition, in some examples method 100 may also comprise obtaining a power loss ratio associated with the display device. The power loss ratio may comprise the ratio of the optical power actually output by the display device to the nominal optical power output dictated by the image data. The difference between the nominal and actual power outputs may be due to performance limits, inefficiencies, and optical power absorption or losses in the components of the display device.

In such cases, determining the image power may comprise determining an adjusted image power based on the brightness levels and the power loss ratio. In some examples, the power loss ratio may be used to adjust downwards the brightness levels. Moreover, determining the excess power status may comprise determining the excess power status based on the adjusted image power and the power threshold.

In addition, it is contemplated that in some examples some steps may be omitted from method 100, additional steps may be added, or steps may be performed in a different order than that shown in FIG. 1.

Figure 4:
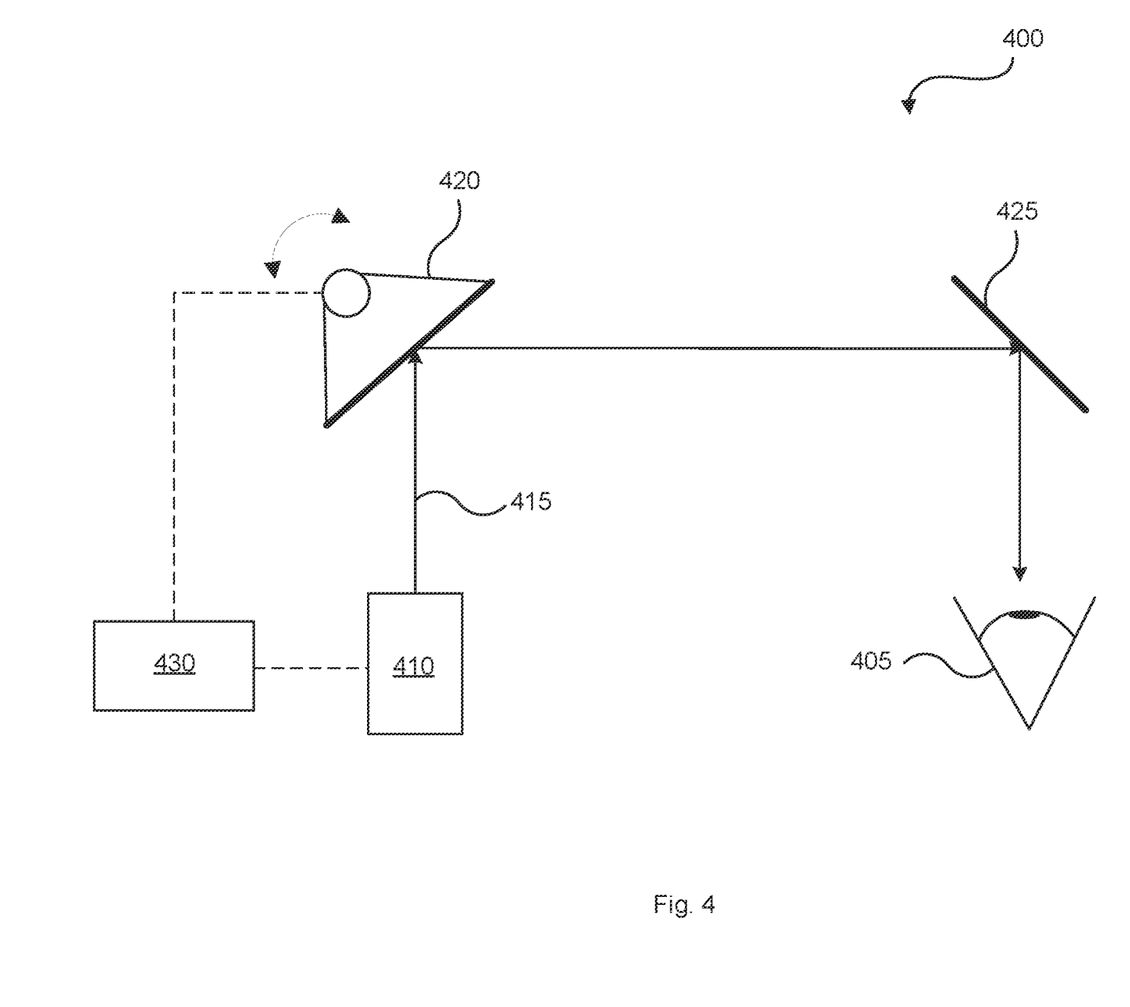
FIG. 4 shows a schematic representation of an example system which may be used to form or project an image viewable by a viewer, in accordance with some embodiments.

Turning now to FIG. 4, a schematic representation of an example system 400 is shown. System 400 may be used to form or project an image viewable by an eye 405 of a viewer. System 400 may also be referred to or described as an image projection device or a display device. System 400 may comprise a light source 410 to generate a source light 415. Light source 410 may comprise a laser, a light emitting diode, and the like. System 400 may also comprise a spatial modulator 420 to receive source light 415 from light source 410. In some examples, spatial modulator 420 may comprise a movable reflector, a micro-electro-mechanical system (MEMS), a digital micromirror device (DMD), and the like.

Furthermore, system 400 may comprise a display element 425 to receive source light 415 from spatial modulator 420 and direct the source light towards eye 405 of a viewer. In some examples, display element 425 may comprise an optical combiner such as a holographic optical combiner, and the like. Moreover, in some examples system 400 may be a part of or incorporated into a wearable heads-up display. Such a heads-up display may have different designs or form factors, such as the form factor of eyeglasses, as is described in greater detail in relation to FIG. 5. In examples where system 400 is in the form factor of glasses, display element 425 may be on or in a lens of the glasses.

In addition, system 400 comprises a controller 430 in communication with light source 410 and spatial modulator 420. Controller 430 may control light source 410 and spatial modulator 420 to project an image. In some examples, the image to be projected may be a still image, a moving image or video, an interactive image, a graphical user interface, and the like. Controller 430 may receive initial image data for an image to be displayed by system 400. The image may comprise a plurality of pixels, and the initial image data may comprise a plurality of brightness levels associated with the pixels.

Controller 430 may also determine an image power based on the brightness levels and determine an excess power status based on the image power and a power threshold. Determination of the image power and the excess power status may be similar to the corresponding determinations described in relation to method 100 and the other methods described herein.

In addition, if the excess power status is affirmative, controller 430 may reduce the brightness levels to generate updated image data. Moreover, controller 430 may control light source 410 and spatial modulator 420 to project the image using the updated image data. It is contemplated that in some examples the power threshold may comprise a safety limit for eye laser exposure.

In some examples the image may have an associated display time and the power threshold may comprise a threshold time and a power limit. The threshold time may be longer than the display time. In such examples, to determine the excess power status controller 430 may generate a predicted displayed power over the threshold time. The predicted displayed power may be generated based on the image power, the display time, and the threshold time. The generation of this predicted displayed power may be similar to the corresponding generation described in relation to method 100 and the other methods described herein.

Controller 430 may then compare the predicted displayed power with the power limit, and set the excess power status to affirmative if the predicted displayed power is greater than the power limit and to negative if the predicted displayed power is less than or equal to the power limit.

Moreover, in some examples the image may be a given frame among a plurality of image frames to be displayed. Each of these frames may have an associated display time. In such examples, to determine the excess power status controller 430 may generate a predicted displayed power over the threshold time. This predicted displayed power may be generated based on the threshold time, a sample displayed time, and a sample displayed power. The sample displayed time and the sample displayed power may be associated with a sample set of the image frames selected from the plurality of the image frames. The generation of this predicted displayed power may be similar to the corresponding generation described in relation to method 100 and the other methods described herein.

Controller 430 may then compare the predicted displayed power with the power limit, and set the excess power status to affirmative if the predicted displayed power is greater than the power limit and to negative if the predicted displayed power is less than or equal to the power limit.

As discussed in relation to method 100, in some examples the sample displayed time may be shorter than the threshold time. In addition, in some examples, to determine the image power controller 430 may determine the image power further based on a set of wavelengths of the source light to be used to display each pixel. In other words, determination of the image power may take into account the wavelengths or colors of the light used to form the image.

Furthermore, in some examples, to determine the image power controller 430 may generate an image histogram of the brightness levels, which image histogram may store a number of the pixels at each of a plurality of predetermined brightness levels. An example histogram is shown in FIG. 2. Moreover, to reduce the brightness levels controller 430 may multiply the brightness levels by a scaling factor being smaller than one. FIG. 3 shows an example histogram generate by multiplying the histogram by FIG. 2 by the scaling factor of 0.5.

In addition, in some examples controller 430 may obtain a power loss ratio associated with the system. Some example sources of optical power loss in system 400 may include optical power losses in light source 410, spatial modulator 420, display element 425, and the like. In such examples, to determine the image power controller 430 may determine an adjusted image power based on the brightness levels and the power loss ratio. Moreover, to determine the excess power status controller 430 may determine the excess power status based on the adjusted image power and the power threshold. Obtaining of the power loss ration and the determinations of the adjusted image power and excess power status may be similar to the corresponding processes described in relation to method 100 and the other methods described herein.

In some examples, the controllers described herein such as controller 430 may comprise a processor in communication with a non-transitory processor-readable medium. The processor-readable medium may comprise instructions to cause the processors to control the light source and the spatial modulator as described in relation to the methods and systems described herein. Moreover, in some examples the controllers may be free-standing components, while in other examples the controllers may comprise functional modules incorporated into other components of their respective systems.

Furthermore, in some examples the controllers or their functionality may be implemented in other ways, including: via Application Specific Integrated Circuits (ASICs), in standard integrated circuits, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, and the like, or as a combination thereof.

Figure 5:
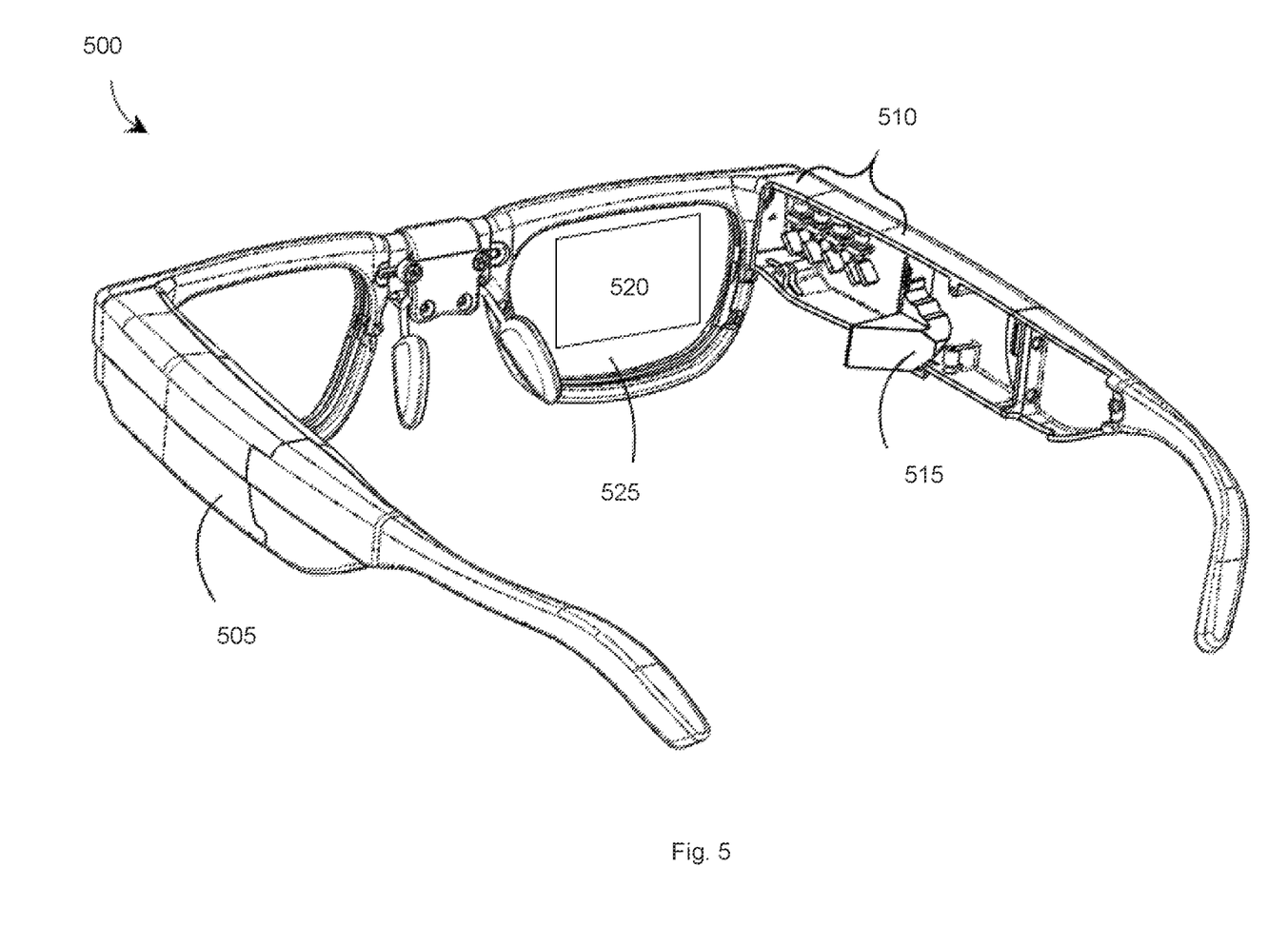
FIG. 5 shows a partial-cutaway perspective view of an example wearable heads-up display, in accordance with some embodiments.

Turning now to FIG. 5, a partial-cutaway perspective view of an example wearable heads-up display (WHUD) 500 is shown. WHUD 500 includes a support structure 505 that in use is worn on the head of a user and has the general form factor and appearance of an eyeglasses (e.g., sunglasses) frame. Eyeglasses or sunglasses may also be generically referred to as "glasses". Support structure 505 may carry components of a system to display an image and dynamically adjust the brightness of that image, such as system 400. For example, the light source module may be received in a space 510 in a side arm of support structure 505. In other examples, one or more of the image projection and brightness adjustment system components or systems described herein may be received in or carried by support structure 505.

The spatial modulator of the systems described herein may be received in or be part of component 515 of support structure 505. The spatial modulator in turn may direct the source light onto a display element 520 carried by a lens 525 of support structure 505. In some examples, display element 520 may be similar in structure or function to display element 425.

The term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, or supported by, with or without any number of intermediary physical objects therebetween.

It is contemplated that the systems described herein may have the features or perform the functions described in relation to method 100 and the other methods described herein. Furthermore, it is contemplated that in some examples the systems described herein may carry out methods or perform functions other than those of the methods described herein.

In addition, it is contemplated that the methods described herein may include the features or perform the functions described in relation to the systems described herein. Moreover, while method 100 and the other methods described herein may be performed by some or all of the systems described herein, it is contemplated that in some examples method 100 and the other methods described herein may also be performed using systems or devices other than the systems described herein.

Throughout this specification and the appended claims, infinitive verb forms are often used. Examples include, without limitation: "to generate," "to determine," "to control," "to receive," and the like. Unless the specific context requires otherwise, such infinitive verb forms are used in an open, inclusive sense, that is as "to, at least, generate," to, at least, determine," "to, at least, control," and so on.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving initial image data for an image to be displayed by a display device, the image comprising a plurality of pixels and the initial image data comprising a plurality of brightness levels associated with the pixels;
   based on the brightness levels and based on a set of wavelengths of a source light to be used to display the plurality of pixels, determining an image power;
   determining an excess power status based on a comparison of the image power to a specified power threshold;
   responsive to the excess power status indicating the image power is to exceed the specified power threshold, reducing the brightness levels to generate updated image data; and
   controlling a light source and a spatial modulator to project the image using the updated image data.

2. The method of claim 1, wherein the controlling the light source and the spatial modulator to project the image comprises projecting the source light toward the spatial modulator.

3. The method of claim 1, wherein:
   the image is to be displayed for a specified display time;
   the power threshold comprises a threshold time and a power limit, the threshold time being longer than the display time; and
   determining the excess power status comprises:
      generating a predicted displayed power over the threshold time, the predicted displayed power generated based on the image power, the display time, and the threshold time; and
      comparing the predicted displayed power with the power limit.

4. The method of claim 1, wherein:
   the image is a given image frame among a plurality of image frames to be displayed by the display device, each image frame having an associated display time;
   the power threshold comprises a threshold time and a power limit, the threshold time being longer than the display time; and
   determining the excess power status comprises:
      generating a predicted displayed power over the threshold time, the predicted displayed power generated based on the threshold time, a sample displayed time, and a sample displayed power, the sample displayed time and the sample displayed power associated with a sample set of the image frames selected from the plurality of the image frames; and
      comparing the predicted displayed power with the power limit.

5. The method of claim 4, wherein the sample displayed time is shorter than the threshold time.

6. The method of claim 1, wherein determining the image power comprises generating an image histogram based on the brightness levels of the pixels.

7. The method of claim 6, wherein the reducing the brightness levels comprises multiplying the brightness levels by a scaling factor less than one.

8. The method of claim 1, further comprising:
   determining a power loss ratio associated with the display device;
   wherein determining the image power comprises determining an adjusted image power based on the brightness levels and the power loss ratio; and
   wherein determining the excess power status comprises determining the excess power status based on the adjusted image power and the power threshold.

9. The method of claim 1, wherein:
   the display device is configured to display the image using at least one laser; and
   the power threshold represents a safety limit for eye laser exposure.

10. A wearable heads-up display comprising the display device and configured to perform the method of claim 1.

11. A system comprising:
   a light source configured to generate a source light;

a spatial modulator configured to receive the source light from the light source;

a display element configured to receive the source light from the spatial modulator and direct the source light towards an eye of a viewer; and a controller in communication with the light source and the spatial modulator, the controller configured to:

receive initial image data for an image to be displayed, the image comprising a plurality of pixels, the initial image data comprising a plurality of brightness levels associated with the pixels;

determine an image power based on the brightness levels;

determine an excess power status based on a comparison of the image power to a specified power threshold;

responsive to the excess power status indicating the image power is to exceed the specified power threshold, reduce the brightness levels to generate updated image data; and control the light source and the spatial modulator to project the image using the updated image data.

12. The system of claim 11, wherein:

the image has an associated display time;

the power threshold comprises a threshold time and a power limit, the threshold time being longer than the display time; and the controller is configured to determine the excess power status by:

generating a predicted displayed power over the threshold time, the predicted displayed power generated based on the image power, the display time, and the threshold time; and comparing the predicted displayed power with the power limit.

13. The system of claim 11, wherein:

the image is a given frame among a plurality of image frames to be displayed, each frame having an associated display time;

the power threshold comprises a threshold time and a power limit, the threshold time being longer than the display time; and the controller is configured to determine the excess power status by:

generating a predicted displayed power over the threshold time based on the threshold time, a sample displayed time, and a sample displayed power, the sample displayed time and the sample displayed power associated with a sample set of the image frames selected from the plurality of the image frames; and comparing the predicted displayed power with the power limit.

14. The system of claim 13, wherein the sample displayed time is shorter than the threshold time.

15. The system of claim 11, wherein the controller is configured to determine the image power further based on a set of wavelengths of the source light to be used to display each pixel.

16. The system of claim 11, wherein the controller is configured to determine the image power by generating an image histogram of the brightness levels based on a plurality of predetermined brightness levels.

17. The system of claim 16, wherein the controller is configured to reduce the brightness levels by multiplying the brightness levels by a scaling factor less than one.

18. The system of claim 11, wherein the controller is further configured to:

obtain a power loss ratio associated with the system;

wherein the controller is configured to determine the image power by determining an adjusted image power based on the brightness levels and the power loss ratio; and wherein the controller is configured to determine the excess power status based on the adjusted image power and the power threshold.

19. The system of claim 11, wherein the system comprises a wearable heads-up display.

20. The system of claim 11, wherein the light source is a laser and the power threshold comprises a safety limit for eye laser exposure.

* * * * *